United States Patent
Ju et al.

(10) Patent No.: US 10,624,486 B2
(45) Date of Patent: Apr. 21, 2020

(54) DEVICE AND METHOD FOR PEELING

(71) Applicant: BOE TECHNOLOGY GROUP CO., LTD., Beijing (CN)

(72) Inventors: Jinyue Ju, Beijing (CN); Tianyue Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 318 days.

(21) Appl. No.: 15/535,901

(22) PCT Filed: Apr. 29, 2016

(86) PCT No.: PCT/CN2016/080586
§ 371 (c)(1),
(2) Date: Jun. 14, 2017

(87) PCT Pub. No.: WO2017/143655
PCT Pub. Date: Aug. 31, 2017

(65) Prior Publication Data
US 2018/0055268 A1 Mar. 1, 2018
US 2018/0213960 A9 Aug. 2, 2018

(30) Foreign Application Priority Data
Feb. 26, 2016 (CN) .......................... 2016 1 0107370

(51) Int. Cl.
*A47J 17/16* (2006.01)
*A23N 7/02* (2006.01)
(52) U.S. Cl.
CPC .............. *A47J 17/16* (2013.01); *A23N 7/026* (2013.01)
(58) Field of Classification Search
CPC .. A47J 17/16; A47J 17/14; A47J 17/18; A47J 17/20; A23N 7/026; A23N 7/02; A23N 7/023; A23N 7/08; A23N 7/10
(Continued)

(56) References Cited

U.S. PATENT DOCUMENTS 7,373,217 B2  5/2008 Young
2004/0089166 A1* 5/2004 Ascari ..................... A23N 7/00
                                                    99/584
(Continued)

FOREIGN PATENT DOCUMENTS

CN    102406421 A    4/2012
CN    103330470 A    10/2013
(Continued)

OTHER PUBLICATIONS

EPO Machine Translation of CN 105105292 A (Year: 2015).*
(Continued)

*Primary Examiner* — Tu B Hoang
*Assistant Examiner* — Erin E McGrath
(74) *Attorney, Agent, or Firm* — Armstrong Teasdale LLP

(57) ABSTRACT

Embodiments of the present disclosure provide a method and a device for peeling, including a peeling means, a fixing means, a first motor, a second motor, a control device for controlling the peeling means, a three-dimensional (3D) modeling apparatus configured to acquire three-dimensional coordinates of the surface of the item to be peeled, and a processing and controlling unit, wherein the processing and controlling unit is connected to the three-dimensional modeling apparatus and configured to determine an operating parameter of the peeling means, an operating parameter of the first motor and an operating parameter of the second motor, the processing and controlling unit is further connected to the first motor and controls the first motor to drive the movement of the fixing means, the processing and controlling unit is further connected to the second motor and control the second motor to drive the movement of the peeling means.

4 Claims, 6 Drawing Sheets

(58) Field of Classification Search
USPC .......................................................... 99/594
See application file for complete search history.

(56) References Cited

U.S. PATENT DOCUMENTS

2006/0272161 A1   12/2006   Di Bitonto et al.
2008/0289515 A1*  11/2008   Knorr .................... A23N 15/02
                                                        99/640
2016/0000265 A1*  1/2016    Palmer ................. A47J 43/0711
                                                        366/287

FOREIGN PATENT DOCUMENTS

| CN | 103494501 A | 1/2014 | | |
|---|---|---|---|---|
| CN | 104082834 A | 10/2014 | | |
| CN | 203914457 U | 11/2014 | | |
| CN | 104256861 A | 1/2015 | | |
| CN | 204336587 U | 5/2015 | | |
| CN | 204410489 U | 6/2015 | | |
| CN | 204467757 U | 7/2015 | | |
| CN | 105105292 A | 12/2015 | | |
| CN | 205409546 U | 8/2016 | | |
| DE | 102005034513 B3 * | 8/2006 | ............. | A23N 7/026 |
| JP | 2001046042 A | 2/2001 | | |

OTHER PUBLICATIONS

EPO Machine Translation of DE 10 2005 034 513 B3 (Year: 2006).*
English translation of PCT International Search Report, Application No. PCT/CN2016/080586, dated Nov. 30, 2016, 3 pages.
PCT Written Opinion, Application No. PCT/CN2016/080586, dated Nov. 30, 2016, 5 pages.: with English translation of relevant part.
China First Office Action, Application No. 201610107370.4, dated Jan. 4, 2018, 10 pps.: with English translation.

* cited by examiner

400

S402
Obtaining three-dimensional coordinates of a surface of an item to be peeled S404
Determining an operating parameter of a peeling means for each region of the surface of the item to be peeled based on the three-dimensional coordinates S406
Determining an operating parameter of a first motor and an operating parameter of a second motor based on the determined operating parameter S408
Controlling the first motor to drive the movement of a fixing means based on the operating parameter of the first motor S410
Controlling the second motor to drive the movement of the peeling means based on the operating parameter of the second motor, wherein the rotation of the second motor enables a control device for controlling the peeling means to control the movement of the peeling means

Fig.4

DEVICE AND METHOD FOR PEELING

CROSS REFERENCE TO RELATED APPLICATIONS

This patent application is a National Stage Entry of PCT/CN2016/080586 filed on Apr. 29, 2016, which claims the benefit and priority of Chinese Patent Application No. 201610107370.4 filed on Feb. 26, 2016, the disclosures of which are incorporated by reference herein in their entirety as part of the present application.

BACKGROUND

Embodiments of the present disclosure relate to a device and method for peeling.

At present, there are usually two ways to peel items such as fruits and vegetables: artificial peeling and mechanical peeling. Artificial peeling is time consuming and laborious, and if you do not carry out a lot of peeling training/practice, it may lead to the phenomenon that the peeling is too thick, uneven and so on. In addition, the user's fingers may also be injured. Mechanical peeling is suitable for peeling an item with a regular shape, but for items with irregular shape, mechanical peeling may lead to the phenomenon that the peeling is too thick and/or too thin or the skin cannot be peeled. As a result, there is a need for an improved solution for peeling.

BRIEF DESCRIPTION

A first aspect of the present disclosure provides a device for peeling. The device for peeling includes a peeling means configured to peel an item to be peeled and a fixing means configured to secure the item to be peeled, wherein the device for peeling further includes a first motor, a second motor, a control device for controlling the peeling means, a three-dimensional (3D) modeling apparatus, a processing and controlling unit, wherein the three-dimensional modeling apparatus is configured to acquire three-dimensional coordinates of a surface of the item to be peeled, the processing and controlling unit is connected to the three-dimensional modeling apparatus and configured to determine, based on the three-dimensional coordinates, an operating parameter of the peeling means for each region of the surface of the item to be peeled, and determine, based on the determined operating parameter, an operating parameter of the first motor and an operating parameter of the second motor, the processing and controlling unit is further connected to the first motor and configured to control the first motor based on the operating parameter of the first motor such that the first motor operates to drive the movement of the fixing means based on the operating parameter of the first motor, the processing and controlling unit is further connected to the second motor and configured to control the second motor based on the operating parameter of the second motor such that the second motor operates to drive the movement of the peeling means based on the operating parameter of the second motor, wherein the rotation of the second motor enables the control device for controlling the peeling means to control the movement of the peeling means.

According to an embodiment, the device for peeling further includes an acquisition means configured to acquire a category of the item to be peeled.

According to an embodiment, the acquisition means includes an image acquiring unit configured to acquire an image of the item to be peeled, and an image recognizing unit configured to perform image recognition on the acquired image of the item to be peeled to determine the category of the item to be peeled.

According to various embodiments, the processing and controlling unit is further configured to determine a thickness parameter for peeling based on the category of the item to be peeled, the processing and controlling unit is further configured to determine, based on the three-dimensional coordinates and the thickness parameter for peeling, an operating parameter of the peeling means for each region of the surface of the item to be peeled.

According to an embodiment, the image recognizing unit is configured to identify, by using image recognition, a contour of a part of the surface of the item to be peeled which requires special handling, the processing and controlling unit is configured to determine, based on the characteristics of the contour, a processing parameter for the contour, and the processing and controlling unit is configured to determine, for the contour, an operating parameter of the peeling means based on the processing parameter for the contour.

According to various embodiments, the three-dimensional modeling apparatus includes one or more of a monocular vision three-dimensional modeling apparatus, a binocular vision three-dimensional modeling apparatus, a multi-vision three-dimensional modeling apparatus, a structured light three-dimensional modeling apparatus, and a pulse ranging three-dimensional modeling apparatus.

A second aspect of the present disclosure provides a method for peeling, the method including obtaining three-dimensional coordinates of a surface of an item to be peeled, determining an operating parameter of a peeling means for each region of the surface of the item to be peeled based on the three-dimensional coordinates, determining an operating parameter of a first motor and an operating parameter of a second motor based on the determined operating parameter, controlling the first motor to drive the movement of a fixing means based on the operating parameter of the first motor, and controlling the second motor to drive the movement of the peeling means based on the operating parameter of the second motor, wherein the rotation of the second motor enables a control device for controlling the peeling means to control the movement of the peeling means.

According to an embodiment, the method further includes acquiring a category of the item to be peeled.

According to one embodiment, acquiring the category of the item to be peeled includes acquiring an image of the item to be peeled by using an image acquiring device, and determining, by performing image recognition on the acquired image of the item to be peeled, the category of the item to be peeled.

According to various embodiments, the method further includes determining a thickness parameter for peeling based on the category of the item to be peeled, and determining, based on the three-dimensional coordinates and the thickness parameter for peeling, an operating parameter of the peeling means for each region of the surface of the item to be peeled.

According to one embodiment, the method further includes identifying, by using image recognition, a contour of a part of the surface of the item to be peeled which requires special handling, determining a processing parameter for the contour based on the characteristics of the contour, and determining, for the contour, an operating parameter of the peeling means based on the processing parameter for the contour.

According to various embodiments, the three-dimensional coordinates of the surface are obtained by using one or more of a monocular vision three-dimensional modeling apparatus, a binocular vision three-dimensional modeling apparatus, a multi-vision three-dimensional modeling apparatus, a structured light three-dimensional modeling apparatus, and a pulse ranging three-dimensional modeling apparatus.

The embodiments of the disclosure have at least the following advantages: 1) it can determine the operating parameters of the peeling means for each region of the surface of the item to be peeled so that more accurate peeling operations can be performed on an irregularly item to be peeled, 2) it can avoid the effects of insufficient peeling and/or excessive peeling by obtaining the category of the item to be peeled and determining a thickness parameter for peeling based on the category of the item to be peeled, and 3) it enables the device for peeling to handle a part which requires special handling by identifying a contour of the part which requires special handling, determining a processing parameter for the part and determining the operating parameter of the peeling means, thereby further enhancing the scope of application of the device for peeling and more precisely processing the part which requires special handling.

BRIEF DESCRIPTION OF THE DRAWINGS

Referring now to the drawings, the drawings are exemplary only and are not drawn to scale, wherein:

FIG. 4 shows a flow chart of a method for peeling according to an embodiment of the present disclosure.

In the drawings, for ease of understanding, the same or similar reference number has been used to refer to elements that have substantially the same or similar construction and/or functions.

DETAILED DESCRIPTION

Embodiments of the present disclosure will be described below with reference to the accompanying drawings. In the following description, numerous specific details are set forth such that those skilled in the art can completely understand and implement the present disclosure. It will be apparent to those skilled in the art that the present disclosure may be implemented without some of these specific details. In addition, it is to be understood that the disclosure is not limited to the specific embodiments described. Rather, it is contemplated that the present disclosure may be practiced with any combination of features and elements described below, whether or not they relate to different embodiments. Accordingly, the following aspects, features, examples and advantages are for illustrative purposes only and are not to be regarded as an element or limitation of the claims, unless expressly stated in the claims.

As used in this application, "peeling" may refer to eliminating/removing a skin of an item to be peeled, eliminating/removing a part of the item to be peeled which requires special handling (e.g., rotting, deteriorating, wormhole, breakage, etc.), cutting the item to be peeled into a uniform film with a specified size, or other cutting operations for the item to be peeled.

Device for Peeling

Figure 1A:
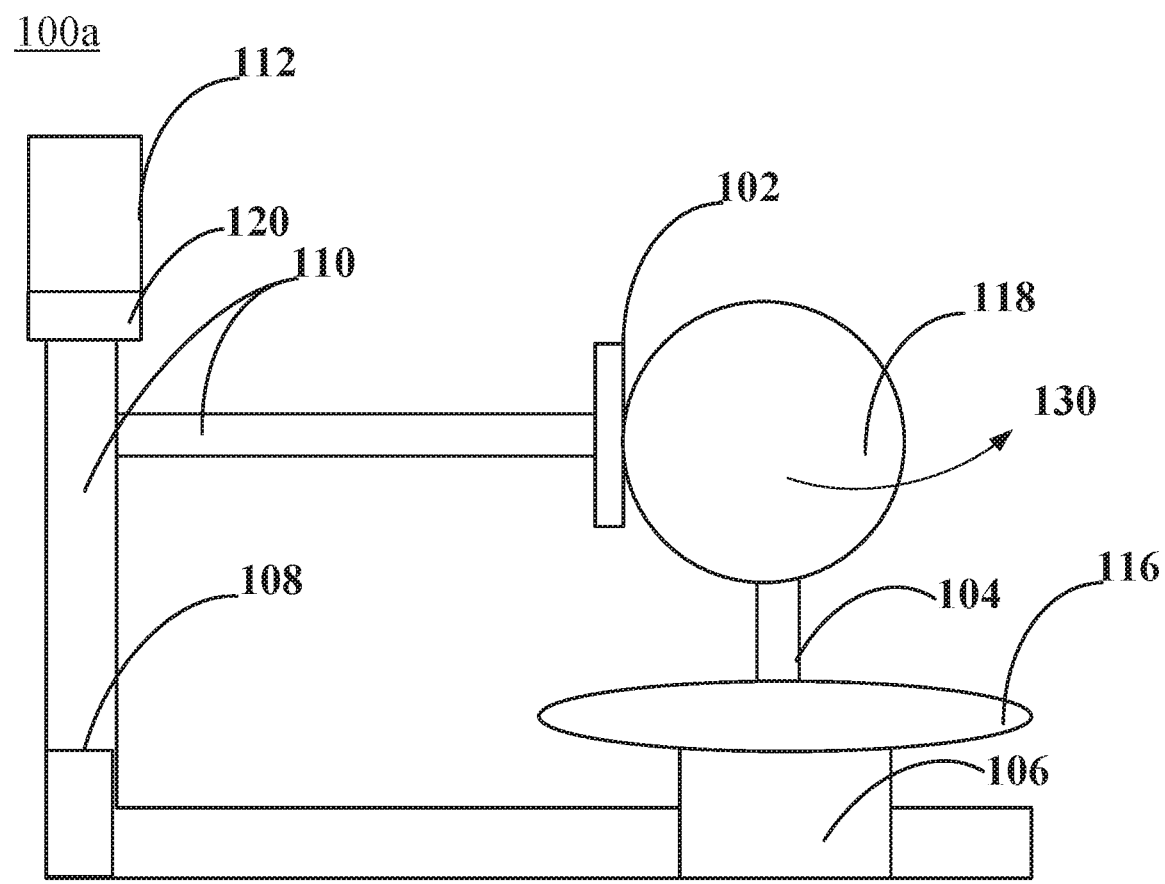
FIG. 1A shows a schematic structural view of a device for peeling according to an embodiment of the present disclosure.

FIG. 1A shows a schematic structural view of a device for peeling 100a according to an embodiment of the present disclosure. As shown in FIG. 1A, the device for peeling 100a includes a peeling means 102 configured to peel the item 118 to be peeled. The item 118 to be peeled may include any item suitable for peeling, such as various fruits, vegetables or other items, for example, apples, pears, peaches, potatoes, cucumbers, eggplants, sweet potatoes, and the like. The peeling means 102 may include various types of existing or future developed peeling knives, cutting knives, any other means suitable for peeling the item to be peeled, or a combination thereof. By way of example, the peeling means 102 may include a peeling knife and a cutter knife, wherein the peeling knife may perform a peeling operation, and the cutting knife may perform a cutting operation on certain parts.

The device for peeling 100a further includes a fixing means 104 configured to secure the item 118 to be peeled. The fixing means may be any existing or future means suitable for securing the item to be peeled, such as a rod with a plurality of pins or any other suitable fixing means. It should be noted that although the fixing means 104 is shown as fixing the item to be peeled 118 at one end of the item to be peeled item 118 in FIG. 1A, the fixing means 104 may fix the item to be peeled 118 at both ends of the item to be peeled item 118 in other embodiments. In this case, the fixing means 104 may include a fixing mechanism with an ejector rod and a pressing rod, or other suitable fixing or holding mechanism. The fixing means 104 may be integrally formed with a tray 116, or the fixing means 104 and the tray 116 may be two separate elements, but may engage with each other.

The device for peeling 100a further includes a first motor 106 provided at one end of the fixing means 104. The first motor 106 may be directly connected with the fixing means 104 or connected with the fixing means 104 by any other suitable mechanism (such as a transmission gear, for example a gear, belt, or the like) and control its movement. The movement of the fixing means 104 may include rotational movement or other suitable forms of movement. When the first motor 106 is rotating, it can cause the fixing means 104 to move (e.g., rotate), thereby causing the item to be peeled to move (e.g., rotate). The first motor 106 may be any suitable type of motor capable of converting electrical energy into mechanical energy, including but not limited to a direct current motor and/or an alternating current motor.

The device for peeling 100a further includes a second motor 108 provided at one end of a control device 110 for controlling the peeling means. The second motor 108 may be connected with the control device 110 for controlling the peeling means by any other suitable mechanism (such as a transmission gear, for example a gear, belt, or the like) and control its movement. When the second motor 108 is rotating, it drives the control device 110 for controlling the peeling means to move. The movement may include up and down movement and/or left and right movement or other suitable forms of movement. The second motor 108 may be any suitable type of motor capable of converting electrical energy into mechanical energy, including but not limited to a direct current motor and/or an alternating current motor.

The device for peeling 100a further includes the control device 110 for controlling the peeling means. The control device 110 for controlling the peeling means is configured to control the movement of the peeling means 102, for example, it may position the peeling means 102 at a specified location (coordinate) and control the orientation of the peeling means 102 or may control other movements of the peeling means 102. The control device 110 for controlling the peeling means may be implemented using any suitable existing or future developed mechanism. For example, the control device 110 for controlling the peeling means may use a combination of, for example, a slider nut and a screw rod to effect lifting movements, use a variety of existing or future developed diverter to achieve steering motion, use a belt and/or pulley mechanism etc. to transmit the kinetic energy of the second motor to the other end of the control device 110 for controlling the peeling means and control the orientation of the peeling means 102 by using a suitable mechanism such as a robot arm for example.

The device for peeling 100a further includes a three-dimensional modeling apparatus 112 for obtaining the three-dimensional coordinates of the surface of the item 118 to be peeled. The three-dimensional coordinates can be three-dimensional Cartesian coordinates, cylindrical coordinates, spherical coordinates, or other three-dimensional coordinates that can be used. The three-dimensional modeling apparatus 112 may include one or more of a monocular vision three-dimensional modeling apparatus, a binocular vision three-dimensional modeling apparatus, a multi-vision three-dimensional modeling apparatus, a structured light three-dimensional modeling apparatus, and a pulse ranging three-dimensional modeling apparatus. As an example, the pulse-ranging three-dimensional modeling apparatus such as a laser rangefinder uses pulsed measurements and performs distance measurement by actively emitting a laser and receiving a reflected signal from an object such as an item to be peeled. For each scan point, the slope distance of a station to the scanning point can be measured, and the difference between the coordinates of each scan point and the station can be obtained with the horizontal and vertical angle of the scan. If the coordinates of the station and an orientation point are the known values, the three-dimensional coordinate of each scan point can be determined. In an embodiment, the three-dimensional modeling apparatus 112 may simultaneously scan the rotating item 118 to be peeled with two lasers, and use a data processor to perform three-dimensional modeling on the scanned data to determine the coordinates of each point of the surface of the item 118 to be peeled.

The device for peeling 100a further includes a processing and controlling unit 120. The processing and controlling unit 120 is connected to the three-dimensional modeling apparatus 112 and determines an operating parameter of the peeling means 102 for each region of the surface of the item 118 to be peeled based on the three-dimensional coordinates. For example, the processing and controlling unit 120 may obtain the three-dimensional coordinates of the surface of the item 118 to be peeled from the three-dimensional modeling apparatus 112. In addition, the processing and controlling unit 120 may divide the surface of the item 118 to be peeled into a plurality of regions depending on the flatness of the surface of the item to be peeled and so on. By way of example, it is assumed that the shape of the item 118 to be peeled (e.g., apple) is regular (e.g., spherical) and the item 118 to be peeled is centered on the fixing means 104. In this case, if the fixing means 104 drives the item 118 to be peeled to rotate, the minimum distance between the surface of the item 118 to be peeled and the peeling means 102 is the same at the same horizontal plane. Thus, the surface of the item 118 to be peeled within the same vertical height range can be divided into a region depending on the size and surface evenness of the item 118 to be peeled. In addition, if the surface of the item 118 to be peeled is irregular, the processing and controlling unit 120 may divide the irregular surface into a plurality of regular sub-surfaces (i.e., regions), and then determine, for each sub-surface, the operating parameter of the peeling means 102. In addition, the surface of the item 118 to be peeled may be divided into a plurality of regions by using any suitable methods, and this disclosure has no limit to this. In general, the processing and controlling unit 120 may determine a reference line for each region. At the time of cutting, the peeling means 102 may complete the peeling operation of the region along the reference line.

Then, for each region, the processing and controlling unit 120 determines the operating parameters of the peeling means 102, such as position (e.g., three-dimensional coordinate), orientation (e.g., cutting angle), trajectory, etc., wherein the position of the peeling means 102 may be defined as the position of any designated portion in the peeling means 102. After the peeling means 102 is adjusted to the position consistent with the operating parameters, it can peel the region. After determining a region, the processing and controlling unit 120 may determine the operating parameters of the peeling means 102 for an adjacent or non-adjacent region.

After determining the operating parameters of the peeling means 102, the processing and controlling unit 120 may determine the operating parameter of the first motor 106 and the operating parameters of the second motor 108 based on the determined operating parameters. For example, assuming that the operating parameters for the peeling means 102 for the first region are that the position is (x, y, z) and the orientation is vertical. The processing and controlling unit 120 may determine the operating parameters of motor which are required to rotate the first region of the item 118 to be peeled (e.g., the reference line as described above) through the coordinates (x, y, z) based on the determined operating parameters. As an example, assuming that the starting point of the reference line of the first region of the item to be peeled is located at coordinates (x1, y1, z1), the processing and controlling unit 120 may determine, based on the coordinates (x, y, z) and coordinates (x1, y1, Z1) and the characteristics of the first region, the number of turns of the first motor 106, and then the operating parameters of the first motor are determined based on the performance parameters of the first motor 106 for example (i.e., enable the first motor to rotate the determined number of turns). In an embodiment, the first motor 106 may rotate at a uniform speed.

In addition, the processing and controlling unit 120 may determine the operating parameters of the second motor 108 which are required for the peeling means 102 to reach the specified coordinates (x, y, z) and adjusting the peeling means 102 to the specified orientation (such as vertical orientation) based on the determined operating parameters. As an example, assuming that the peeling means 102 is initially located at the coordinates (x2, y2, z2), the processing and controlling unit 120 may calculate the height difference between the coordinates (x, y, z) and the coordinates (x2, y2, z2), determine the height of the peeling means 102 required to rise/fall, and determine the operating parameters of the second motor 108 based on the performance parameters of the control device 110 for controlling the peeling means. Similarly, the processing and controlling unit 120 may further determine the operating parameters of the second motor 108 for adjusting the left/right movement of the control device 110 for controlling the peeling means, and finally causing the peeling means 102 to reach the specified coordinates (x, y, z). When the peeling means 102 reaches the coordinates (x, y, z), the processing and controlling unit 120 may further determine the operating parameters of the second motor 108 for controlling the control device 110 for controlling the peeling means to adjust the peeling means 102 to a specified orientation (e.g., vertical orientation in this embodiment). It is noted that the movement order (rise/fall, left/right movement, and orientation adjustment) of the control device 110 for controlling the peeling means can be varied, and the disclosure has no limit to this. In other embodiments, the processing and controlling unit 120 may use any suitable method to determine the operational parameters required to adjust the peeling means 102 to a specified coordinates (x, y, z).

The processing and controlling unit 120 is also connected to the first motor 106. The processing and controlling unit 120 may control the first motor 106 based on the operating parameters of the first motor such that the first motor 106 operates based on the operating parameters of the first motor to drive the movement of the fixing means 104. In this case, the processing and controlling unit 120 may act as a controller for the first motor.

The processing and controlling unit 120 is also connected to the second motor 108. The processing and controlling unit 120 may control the second motor 108 based on the operating parameters of the second motor such that the second motor 108 operates based on the operating parameters of the second motor to drive the movement of the peeling means 102, wherein the rotation of the second motor 108 causes the control device 110 for controlling the peeling means to be able to control the movement of the peeling means 102. In this case, the processing and controlling unit 120 may act as a controller for the second motor.

In addition, depending on the type of motor used, the operating parameters of the first motor and the second motor may include, but are not limited to, voltage, current, rotational speed, power, start and stop settings, acceleration/deceleration time, torque, delay, and the like. In addition, when the processing and controlling unit 120 determines the operating parameters of the first motor and the operating parameters of the second motor, it is also possible to consider operating parameters such as motion sequence, timing, and the like. For example, as described above, different motion sequences (rise/fall, left/right movement, and orientation adjustment) of the control device 110 for controlling the peeling means may correspond to different operating parameters of the second motor. As an example, the operating parameters of the first motor and/or the operating parameters of the second motor may be associated with the timing.

In addition, it should be noted that the processing and controlling unit 120 may be an element or include a plurality of discrete elements. As an example, the processing and controlling unit 120 may include a data processing unit, a first motor controller, and a second motor controller. In this case, the first motor controller may be located in the vicinity of the first motor or integrated with the first motor, and the second motor controller may be located near the second motor or integrated with the second motor. As another example, the processing and controlling unit 120 may include a data processing unit and a motor controller. In this case, the motor controller can simultaneously control the first motor and the second motor.

In the above embodiment, the device for peeling 100*a* may determine the operating parameters of the peeling means 102 for each region of the surface of the item to be peeled, so that a more precise peeling operation may be performed on the irregular item 118 to be peeled.

In an embodiment, the device for peeling 100*a* further includes an acquisition means (not shown) configured to acquire the category of the item to be peeled. The category of the item 118 to be peeled may include, but are not limited to, the type of item, the degree of maturation, the degree of soft and hard, the time of storage, or a combination thereof. The processing and controlling unit 120 is able to determine a thickness parameter for peeling based on the category of the item 118 to be peeled. For example, the peeling thickness of different types of items may be different. As an example, the peeling thickness of an apple is different from that of a pumpkin. Even if the same type of items, if the preservation time is different, then their respective peeling thickness is different. For example, the peeling thicknesses of fresh potatoes and potatoes saved for a year are different. The acquisition means may be any suitable means, such as a button, a press key, a touch screen, a voice input and recognition device, a keypad, a keyboard, etc., through which the category of the item to be peeled can be entered by the user. By way of example, the user can obtain the category of the item to be peeled 118 by pressing the acquisition means such as a button corresponding to the category of the item to be peeled. The category of the item 118 to be peeled may then be transferred to the processing and controlling unit 120.

In addition, the acquisition means may also obtain the category of the item to be peeled by using image recognition in other embodiments. In this case, the acquisition means may include an image acquiring unit (not shown) and an image recognizing unit (not shown). The image acquiring unit may be any suitable image acquiring means, such as various image sensors, etc., for acquiring an image of the item to be peeled. The image recognizing unit may be any device capable of processing and recognizing an image, such as a processor, a CPU, a digital signal processor, etc., which is used to perform image recognition on the acquired image of the item to be peeled to determine the category of the item to be peeled. The image recognizing unit may use any applicable existing or future developed image recognition algorithm, and this disclosure has no limit on it.

In an embodiment, the processing and controlling unit 120 may further determine a thickness parameter for peeling based on the category of the item to be peeled. For example, the device for peeling 100*a* may store in its memory (not shown) an entry including the category of an item to be peeled and its corresponding thickness parameter for peeling (e.g., the entry may be stored in various suitable data structures such as a database). The processing and controlling unit 120 may use the category of the item to be peeled as a retrieval/query item to obtain the thickness parameter for peeling from the database.

After obtaining the thickness parameter for peeling, the processing and controlling unit 120 may further determine an operating parameter of the peeling means 102 for each region of the surface of the item to be peeled based on the three-dimensional coordinates and the thickness parameter for peeling.

In the above embodiment, the device for peeling 100*a* can avoid the effects of insufficient peeling and/or excessive peeling by obtaining the category of the item to be peeled and determining the thickness parameter for peeling based on the category of the item to be peeled.

In an embodiment, the image recognizing unit may identify, by using image recognition, a contour of a part of the surface of the item 118 to be peeled which requires special handling. The part that requires special handling may include, but not limited to, rotting, metamorphic, wormhole, damaged, or the like, or combinations thereof. In general, an image of the part that requires special handling is different from an image of a normal part, and the part that requires special handling can be identified by any suitable image recognition method. The contour of the part that requires special handling may be defined by the three-dimensional coordinates of the surface of the item to be peeled. The processing and controlling unit 120 may then determine a processing parameter for the contour of the part based on the characteristics of the contour of the part. The processing parameter for the contour of the part may include, but not limited to, degree of decay, degree of metamorphism, the size of the wormhole, and degree of damage. The processing parameter for the contour of the part may include, but not limited to, thickness or depth for peeling for each sub-parts of the part. Subsequently, the processing and controlling unit 120 may determine, for the contour of the part, an operating parameter of the peeling means 102 based on the processing parameters of the contour of the part. By way of example, it is possible to control the peeling means 102, such as a cutter, to perform a cutting operation on the part. It is noted that the above-described operations for identifying the contour of the part, determining the processing parameter for the contour of the part and determining the operating parameter of the peeling means can be iteratively performed until further operations of the part are not required.

In the above embodiment, the device for peeling 100a can handle a part which requires special handling by identifying the contour of the part which requires special handling, determining the processing parameter for the contour of the part and determining the operating parameter of the peeling means, thereby further enhancing the scope of application of the device for peeling 100a and more precisely processing the part which requires special handling.

Figure 1B:
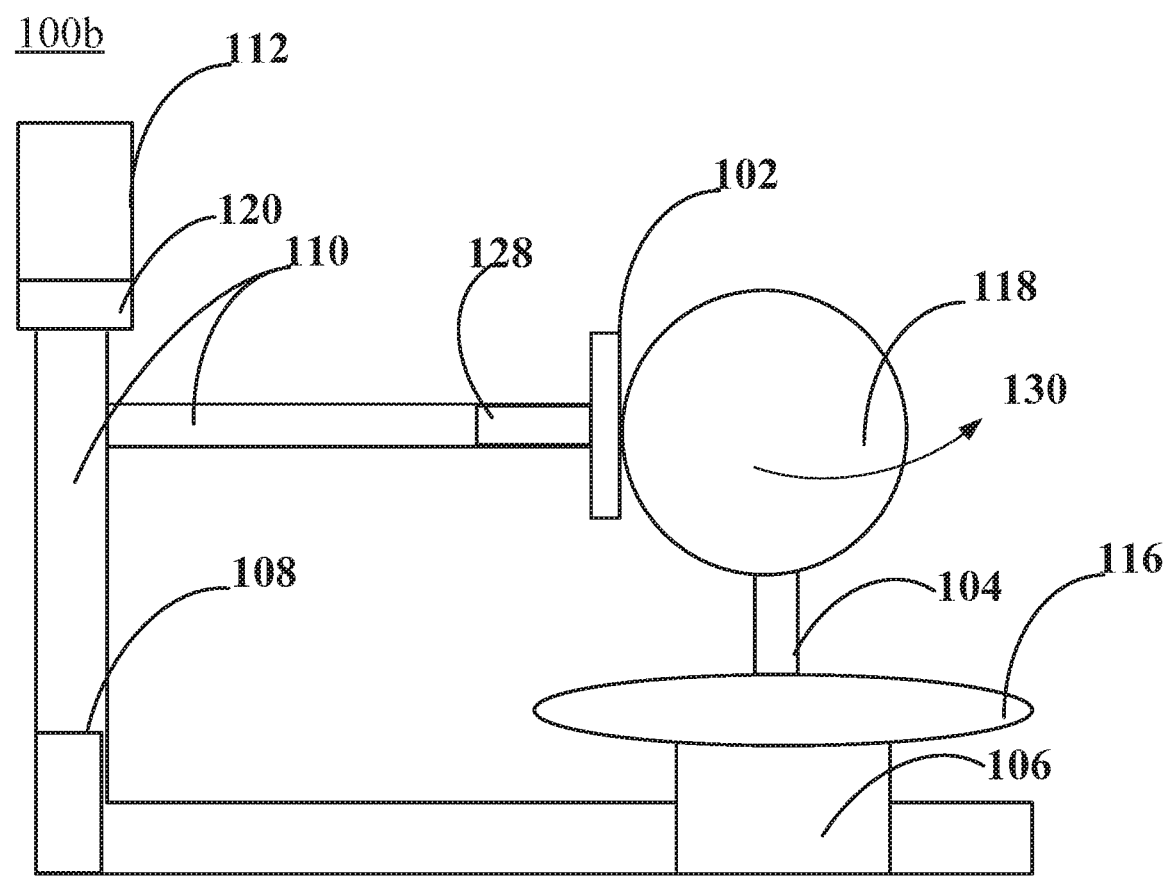
FIG. 1B shows a schematic structural view of a device for peeling according to another embodiment of the present disclosure.

FIG. 1B shows a schematic structural view of a device for peeling 100b according to another embodiment of the present disclosure. In FIG. 1B, the same reference numerals are used for the same or similar elements as those in FIG. 1A. For sake of brevity, the function of each element is not described in detail. In contrast to FIG. 1A, the second motor includes a second motor 108 and a second motor 128 in FIG. 1B. The second motor 108 may control the rise and fall movement, and left and right movement of the peeling means 102 and the second motor 128 may control the orientation of the peeling means 102.

Figure 2A:
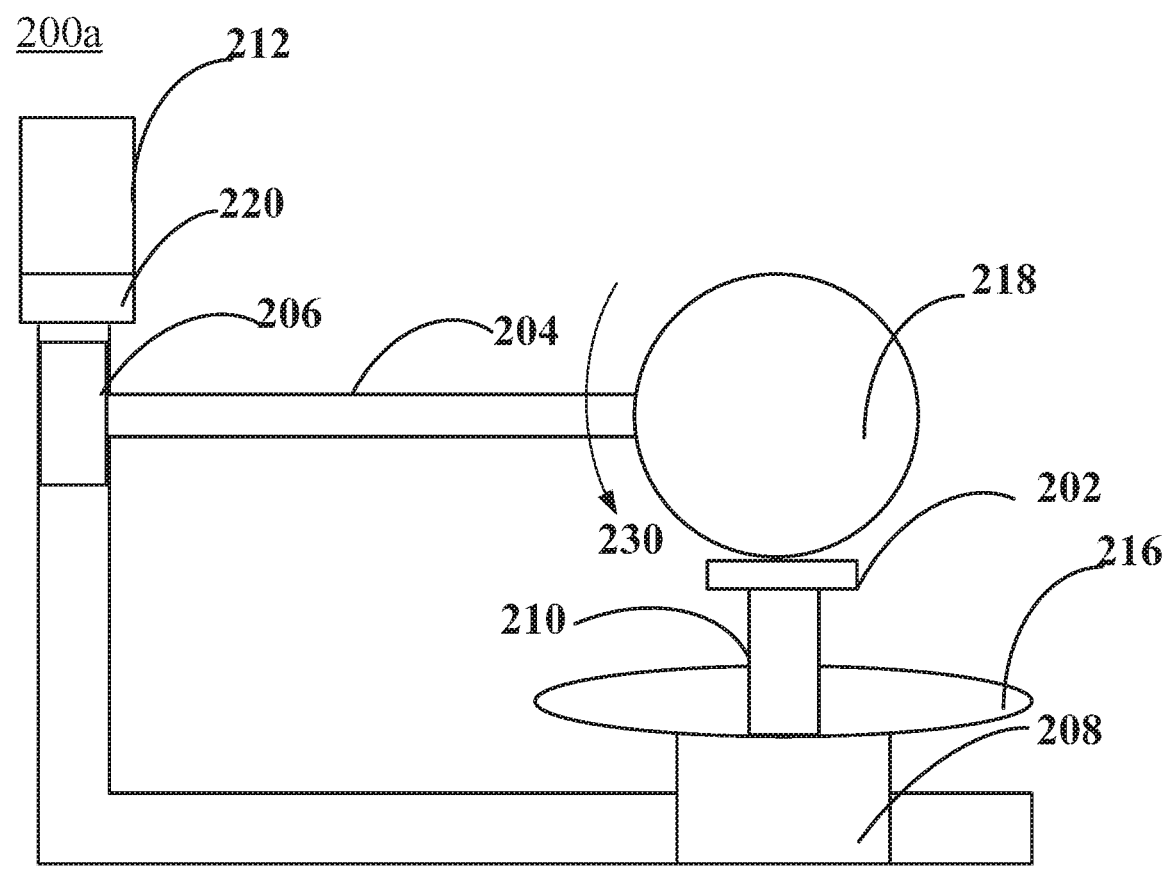
FIG. 2A shows a schematic structural view of a device for peeling according to another embodiment of the present disclosure.

FIG. 2A shows a schematic structure view of a device for peeling 200a according to another embodiment of the present disclosure. The similar reference numerals are used for the same or similar elements as those of FIGS. 1A and 1B. For example, the peeling means 202 may correspond to the peeling means 102 of FIGS. 1A and 1B, wherein in the reference numerals, the first number from left represents the number of Figure and the remaining two represent the number of an element. Unlike FIGS. 1A and 1B, the peeling means 202 and the control device 210 for controlling the peeling means in FIG. 2A are located at the position of the fixing device 104 in FIGS. 1A and 1B, while the fixing device 204 is located at the position of peeling means 102 and the control device 110 for controlling the peeling means in FIGS. 1A and 1B, wherein the peeling means 202 is connected to the control device 210 for controlling the peeling means. In addition, the positions of the first motor 206 and the second motor 208 are also adjusted. In the configuration of FIG. 2A, the first motor 206 may drive the fixing means 204 to rotate in the direction (or opposite direction) indicated by an arrow 230 in the vertical plane, whereas in FIGS. 1A and 1B the first motor 106 may drive the fixed means 104 to rotate in the direction indicated by an arrow 130 (or in the opposite direction) in the horizontal plane.

Figure 2B:
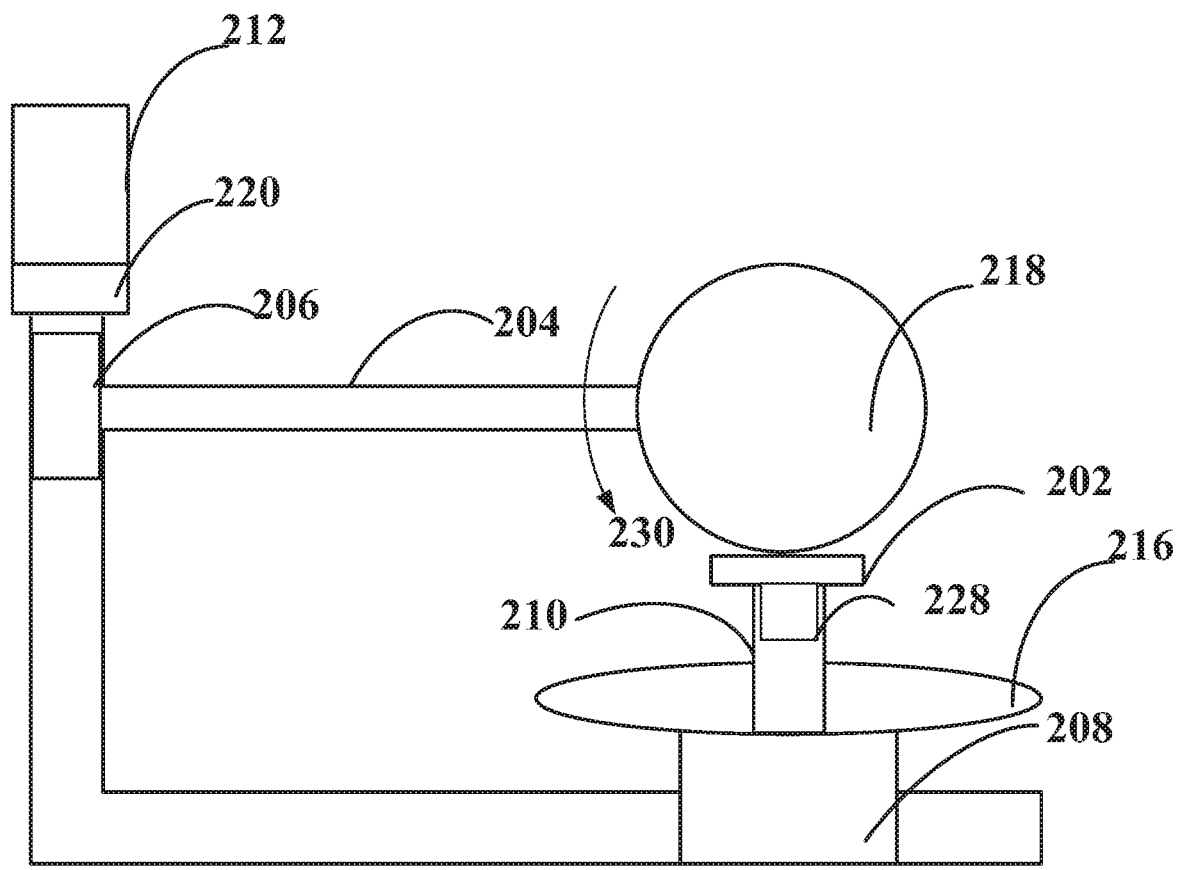
FIG. 2B shows a schematic structural view of a device for peeling according to another embodiment of the present disclosure.

FIG. 2B shows a schematic structural view of a device for peeling 200b according to another embodiment of the present disclosure. In FIG. 2B, the same reference numerals are used for the same or similar elements as in FIG. 2A. For sake of brevity, the function of each element is not described in detail. Unlike FIG. 2A, the second motor includes a second motor 208 and a second motor 228 in FIG. 2B. The second motor 208 may control the rise and fall movement, and left and right movement of the control device for controlling the peeling means and the second motor 228 may control the orientation of the peeling means 202.

It is noted that the various elements shown in FIGS. 1A, 1B, 2A, and 2B are merely examples, and various elements may have any suitable size and shape and may be arranged in any suitable positions in practice. This disclosure has no limit on this.

Figure 3:
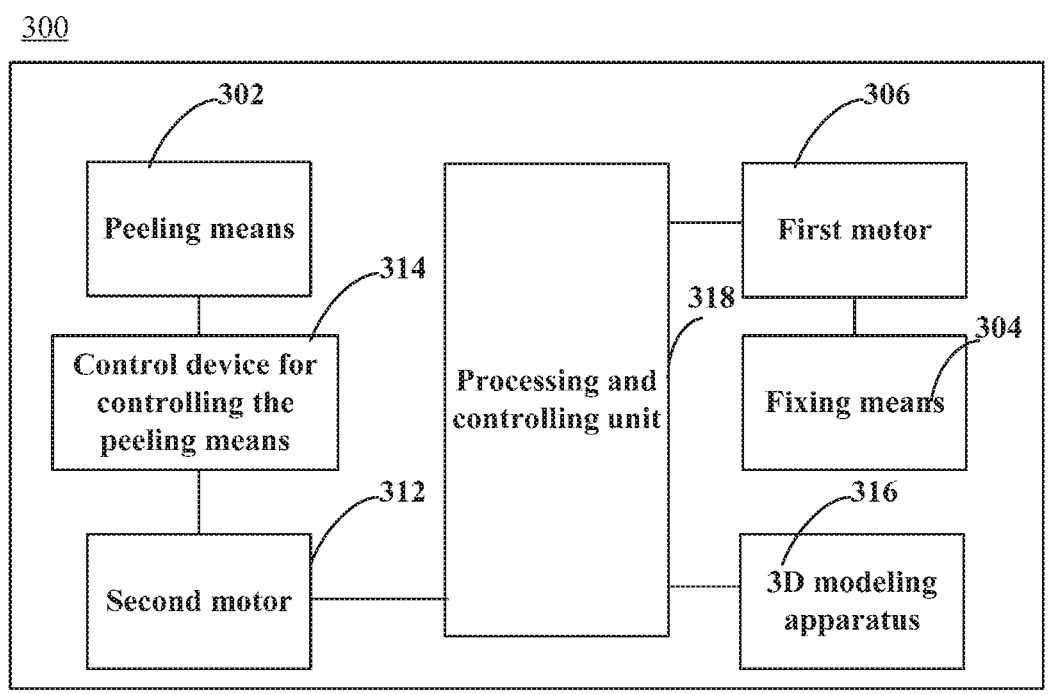
FIG. 3 shows a block diagram of a device for peeling according to an embodiment of the present disclosure.

FIG. 3 shows a block diagram of a device for peeling 300 according to an embodiment of the present disclosure. In FIG. 3, the peeling means 302 may be connected to a control device 314 for controlling the peeling means, wherein the connection may generally be a mechanical connection through which the operation of the peeling means 302 can be controlled. The second motor 312 may be connected to the control device 314 for controlling the peeling means, wherein the connection may generally be a mechanical connection through which the rotational energy of the second motor 312 may be converted into movement of the control device 314 for controlling the peeling means. The second motor 312 is electrically connected to the processing and controlling unit 318. The processing and controlling unit 318 is also electrically connected to the first motor 306. The first motor 306 is connected to the fixing means 304, wherein the connection may generally be a mechanical connection through which the fixing means 304 may be driven.

In addition, the image recognizing unit in the acquisition means, the data processor in the three-dimensional modeling apparatus 316, and the processing and controlling unit 318 in the above embodiments may be discrete elements, or one or more or all of them may be integrated in one element.

In addition, the device for peelings 100a, 100b, 200a, 200b, and 300 may further include any other suitable components, such as power modules, power switches, memory, and the like. This disclosure has no limit on it.

Method for Peeling

Under the same inventive concept, FIG. 4 shows a flow chart of a method 400 for peeling according to an embodiment of the present disclosure. The method 400 for peeling may be performed by the above-described device for peeling 100a, 100b, 200a, 200b, or 300. The method 400 will be described below in connection with the figure. The description of same parts as those of the foregoing embodiments is appropriately omitted.

The method 400 for peeling includes the following:

In step S402, obtaining the three-dimensional coordinates of a surface of an item to be peeled;

In step S404, determining an operating parameter of a peeling means for each region of the surface of the item to be peeled based on the three-dimensional coordinates;

In step S406, determining an operating parameter of a first motor and an operating parameter of the second motor based on the determined operating parameter;

In step S408, controlling the first motor to drive the movement of a fixing means based on the operating parameter of the first motor; and In step S410, controlling the second motor to drive the peeling means based on the operating parameter of the second motor, wherein the rotation of the second motor enables the control device for controlling the peeling means to control the movement of the peeling means.

In an embodiment, the method 400 for peeling further includes acquiring a category of the item to be peeled.

In an embodiment, acquiring the category of the item to be peeled includes acquiring an image of the item to be peeled by using an image acquiring device, and determining, by performing image recognition on the acquired image of the item to be peeled, the category of the item to be peeled.

In an embodiment, the method 400 for peeling further includes determining a thickness parameter for peeling based on the category of the item to be peeled, and determining, based on the three-dimensional coordinates and the thickness parameter for peeling, an operating parameter of the peeling means for each region of the surface of the item to be peeled.

In an embodiment, the method 400 for peeling further includes identifying, by using image recognition, a contour of a part of the surface of the item to be peeled which requires special handling, determining a processing parameter for the contour based on the characteristics of the contour, and determining, for the contour, an operating parameter of the peeling means based on the processing parameter for the contour.

In an embodiment, the three-dimensional coordinates of the surface are obtained by using one or more of a monocular vision three-dimensional modeling apparatus, a binocular vision three-dimensional modeling apparatus, a multi-vision three-dimensional modeling apparatus, a structured light three-dimensional modeling apparatus, and a pulse ranging three-dimensional modeling apparatus.

The different functions described in the application may be performed in a different order and/or concurrently with each other. In addition, one or more of the functions described above may be non-essential or may be combined.

While the embodiments of the present disclosure have been described above with reference to the accompanying drawings, it will be understood by those skilled in the art that the foregoing description is exemplary only and is not intended to be limiting of the present disclosure. Various modifications and variations of the embodiments of the present disclosure may be made without departing from the spirit and scope of the disclosure, the scope of which is to be determined only by the appended claims.

What is claimed is:

1. A device for peeling, comprising:
   a peeling means configured to peel an irregular item to be peeled;
   a fixing means configured to secure the irregular item to be peeled;
   the device for peeling further comprising a first motor, a second motor, a control device for controlling the peeling means, a three-dimensional (3D) modeling apparatus, a processing and controlling unit comprising a processor and a motor controller, and an acquisition means, wherein:
   the acquisition means is configured to acquire a category of the irregular item to be peeled and the acquisition means comprises:
   an image acquiring unit configured to acquire an image of the irregular item to be peeled; and
   a digital signal processor configured to perform image recognition on the acquired image of the irregular item to be peeled through using an image recognition algorithm to determine the category of the irregular item to be peeled, wherein the category of the irregular item to be peeled includes at least one of a type of item, a degree of maturation, a degree of soft and hard or a time of storage:
   the three-dimensional modeling apparatus is configured to acquire three-dimensional coordinates of a surface of the irregular item to be peeled;
   the digital signal processor is further configured to identify, by using image recognition, a contour of a part of the surface of the irregular item to be peeled which requires special handling, wherein the part requiring the special handling, includes at least one of a rotting part, a metamorphic part, a wormhole part or a damaged part;
   the processing and controlling unit is configured to determine a thickness parameter for peeling based on the category of the irregular item to be peeled; and determine, based on the three-dimensional coordinates and the thickness parameter for peeling, the operating parameter of the peeling means for each region of the surface of the irregular item to be peeled;
   the processing and controlling unit is further configured to determine, based on characteristics of the contour of the part requiring the special handling, a processing parameter for the contour of the part requiring the special handling; and determine, for the contour of the part requiring the special handling, an operating parameter of the peeling means based on the processing parameter for the contour of the part requiring the special handling, wherein the processing parameter for the contour of the part requiring the special handling includes a thickness or a depth for peeling for each sub-parts of the part requiring the special handling;
   the processing and controlling unit is connected to the three-dimensional modeling apparatus and configured to determine, based on the determined operating parameter, an operating parameter of the first motor and an operating parameter of the second motor;
   the processing and controlling unit is further connected to the first motor and configured to control the first motor based on the operating parameter of the first motor such that the first motor operates to drive a movement of the fixing means based on the operating parameter of the first motor; and
   the processing and controlling unit is further connected to the second motor and configured to control the second motor based on the operating parameter of the second motor such that the second motor operates to drive a movement of the peeling means based on the operating parameter of the second motor, wherein a rotation of the second motor enables the control device for controlling the peeling means to control the movement of the peeling means.

2. The device of claim 1, wherein the three-dimensional modeling apparatus comprises at least one of:

a monocular vision three-dimensional modeling apparatus;
a binocular vision three-dimensional modeling apparatus;
a multi-vision three-dimensional modeling apparatus;
a structured light three-dimensional modeling apparatus; and
a pulse ranging three-dimensional modeling apparatus.

3. A method for peeling, comprising:
obtaining three-dimensional coordinates of a surface of an irregular item to be peeled;
acquiring an image of the irregular item to be peeled by using an image acquiring device;
determining, by a digital signal processor performing image recognition on the acquired image of the irregular item to be peeled through using an image recognition algorithm, a category of the irregular item to be peeled, wherein the category of the irregular item to be peeled includes at least one of a type of item, a degree of maturation, a degree of soft and hard, a time of storage;
determining a thickness parameter for peeling based on the category of the irregular item to be peeled; and
determining, based on the three-dimensional coordinates and the thickness parameter for peeling, the operating parameter of the peeling means for each region of the surface of the irregular item to be peeled:
wherein determining, based on the three-dimensional coordinates and the thickness parameter for peeling, the operating parameter of the peeling means for each region of the surface of the irregular item to be peeled further comprises:
identifying, by using image recognition, a contour of a part of the surface of the irregular item to be peeled which requires special handling, wherein the part requiring the special handling includes at least one of a rotting part a metamorphic part, a wormhole part or a damaged part,
determining, based on characteristics of the contour of the part requiring the special handling, a processing parameter for the contour of the part requiring the special handling;
determining, for the contour of the part requiring the special handling, an operating parameter of the peeling means based on the processing parameter for the contour of the part requiring the special handling, wherein the processing parameter for the contour of the part requiring the special handling includes a thickness or a depth for peeling for each sub-parts of the part requiring the special handling;
determining an operating parameter of a first motor and an operating parameter of a second motor based on the determined operating parameter;
controlling the first motor to drive a movement of a fixing means based on the operating parameter of the first motor; and
controlling the second motor to drive a movement of the peeling means based on the operating parameter of the second motor, wherein a rotation of the second motor enables a control device for controlling the peeling means to control the movement of the peeling means.

4. The method according to claim 3, wherein the three-dimensional coordinates of the surface are obtained using at least one of:
monocular vision three-dimensional modeling;
binocular vision three-dimensional modeling;
multi-vision three-dimensional modeling;
structured light three-dimensional modeling; and
pulse ranging three-dimensional modeling.

* * * * *

UNITED STATES PATENT AND TRADEMARK OFFICE
CERTIFICATE OF CORRECTION

| | | |
|---|---|---|
| PATENT NO. | : 10,624,486 B2 | Page 1 of 1 |
| APPLICATION NO. | : 15/535901 | |
| DATED | : April 21, 2020 | |
| INVENTOR(S) | : Jinyue Ju et al. | |

It is certified that error appears in the above-identified patent and that said Letters Patent is hereby corrected as shown below:

In the Claims

In Claim 1, Column 12, Line 16, delete "storage:" and insert therefor -- storage; --.
In Claim 1, Column 12, Line 24, delete "handling, includes" and insert therefor -- handling includes --.
In Claim 3, Column 14, Line 2, delete "rotting part a metamorphic" and insert therefor -- rotting part, a metamorphic --.
In Claim 3, Column 14, Line 3, delete "damaged part," and insert therefor -- damaged part; --.

Signed and Sealed this
Twenty-first Day of July, 2020

Andrei Iancu
*Director of the United States Patent and Trademark Office*